May 31, 1960   A. SCHINDEL   2,938,612
OVERRUNNING BEARING LUBRICATION MEANS
Filed Jan. 31, 1958
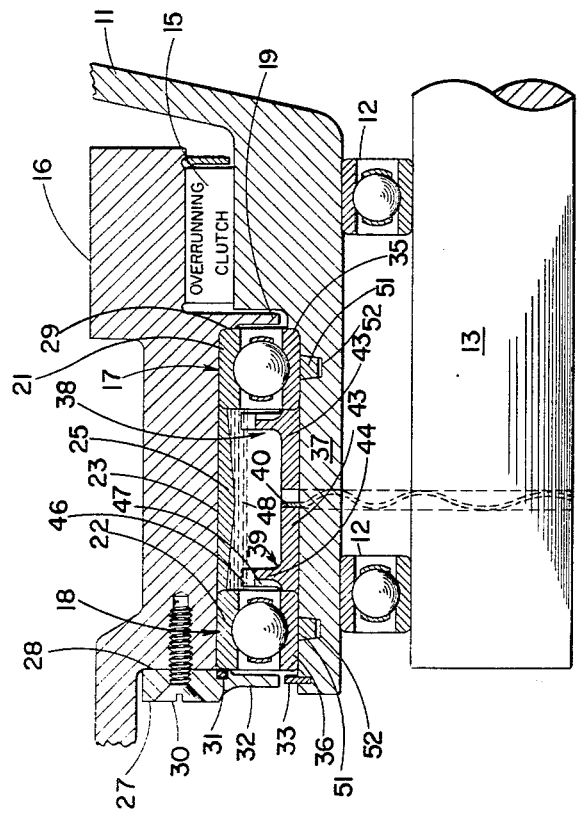
INVENTOR.
ARNOLD SCHINDEL
BY
Robert W. Ely
ATTORNEY United States Patent Office 2,938,612
Patented May 31, 1960

2,938,612

OVERRUNNING BEARING LUBRICATION MEANS

Arnold Schindel, Fairlawn, N.J., assignor to Bendix Aviation Corporation, Utica, N.Y., a corporation of Delaware Filed Jan. 31, 1958, Ser. No. 712,400

6 Claims. (Cl. 192—41)

This invention relates to the lubrication and cooling of anti-friction bearings and more particularly concerns torque transmitting devices having overrunning grease-packed bearings which are in operation for extended periods of time and in a relatively high ambient temperature region.

In aircraft installations, certain turbine starters for turbine-type engines have high-speed, grease-packed ball bearings which have outer race rotation after start-up due to an overrunning arrangement. Since such operation occurs for extended periods of time and high ambient temperatures exist, these overrunning bearings notoriously suffer from lack of lubrication to the inner stationary races of the bearings since the grease is centrifuged outwardly and the only grease which is applied is what is taken back by the rotating balls. These balls are rapidly stripped of grease by action of the separators.

The primary object of the present invention is to provide improved means for suitably lubricating and cooling the inner part of high-speed grease-packed bearings in the application above noted.

Another object is the provision of means for returning centrifugally stagnated grease axially from the cavity between bearings to adjacent the outer races and then radially to the inner races of the bearings.

A further object is the provision of fingered-and-grooved flange devices for such return of grease which are also spring-loaded against the inner races to prevent skidding of the balls due to outer race rotation.

Another object is the provision in such bearings of means for obviating the detrimental effect of an air gap between a support member and the loosely-fitted race of a bearing.

The achievement of the foregoing objects, along with the features and advantages of the invention, will be apparent from the following detailed description and the accompanying drawing in which:

Fig. 1 is a side cross-sectional view of the upper half of the overrunning clutch and bearing section of an aircraft starter embodying the present invention, and Fig. 2 is a perspective view of the ram diverter device which picks up and channels grease from a radially-outer location to the radially-inner part of the bearings.

With reference to Fig. 1, it is to be understood that the parts above the shaft-like support member would be duplicated below this member in a full view of the embodiment of the invention. Such duplication has been omitted in order to present a more clear, enlarged view of the invention.

Referring to Fig. 1, it can be seen that an annular cage or driving member 11 is supported by two conventional bearings 12 which are carried on a shaft-like stationary member 13. Shaft or member 13 is rigidly attached to the starter housing (not shown). The cage or driving member 11 is connected to a turbine wheel via a planetary gear train (not shown) so that the cage member 11 is accelerated in a clockwise direction.

Torque is transmitted radially outwardly via overrunning clutch 15 to the annular output or driven element 16. The annular clutch 15 is the conventional sprag type clutch, such as the type described in U.S. Patent #2,473,250. Clutch 15 permits the driven element 16 to over-run the starter driving member 11. Such torque transmitting devices, when over-running, have the bearing lubrication problem above noted.

The outer driven element 16 is supported by back bearing 17 and front bearing 18 which are supported by the cage member 11. A radially-inward extension or ring 19 from the driven member provides shielding or confining structure to maintain the grease lubricant within the bearing cavity at the rear bearing adjacent the clutch 15. Annular bearings 17, 18 conventionally include a ring of balls which are spaced by separators. The two annular outer races 21, 22 of bearings 17, 18 are pressed-fitted on the internal surface 23 of the driven element 16 and are spaced apart by a tapered spacer sleeve 25. It is to be noted that annular sleeve 25 has its inner surface inclined radially outward from its center toward the outer base parts of the outer races. This inclination is about one to five degrees (preferably about two degrees) to the horizontal plane or axis so that outwardly-urged or centrifuged grease will move toward the outer bearing races. A five degree inclination is shown in interest of clarity.

The ring-like plate 27 at the front annular face 28 of the driven element 16 provides axial loading of the bearings against shoulder 29 at the base of extension 19. The plate 27 is attached to driven element 16 by means of screws 30 and has an O-ring seal 31. The radially-inward part 32 of plate 27 provides means for confining grease at the front bearing 18. At the front end of the driving member 11, a lock ring 33 is provided for retention of the entire overrunning structure. The back and front annular inner races 35, 36 are loosely fitted on the smaller-diameter extension 37 of the driving member 11. Between the two inner races 35, 36, two grease-return collars or ram diverters 38, 39 are positioned on driving element 11 and are separated by a resilient wave spring washer 40 which abuts the interior transverse edges of the diverters. The spring washer 40 applies a preload to the bearing inner races which prevents skidding of the balls due to outer race rotation. It is to be noted that the interior sides of the inner races are opposite the ends of the sleeve 25.

The grease-return collars or ring-like ram diverters 38, 39 are identical except basically of opposite geometry and have means adjacent the grease-cavity side of the bearings for picking up grease and moving or channeling it to the inner races 35, 36. The grease return collars 38, 39 are comprised of a sleeve portion 43 and a flange portion 44 extending radially-outward toward the ends of the spacer sleeve 25. The flange 44 has four equi-spaced buckets or fingers 46 which are welded thereto and project generally-radially therefrom and four radially-extending, axially-contoured passages or slots 47 which begin at the base of the buckets and are curved axially at the radially-inward end toward the bearing inner race. The buckets 46 project into the grease 48 which is centrifuged outwardly and moved toward the bearings by sloped sleeve 25. The depth of the passages 47 is about half the width of the flange 44 and is about one-sixteenth of an inch. The height of the buckets 46 is about half the length of the passages 47.

In Fig. 2, it can be seen that each bucket 46 is inclined with respect to a radial line and into the direction of the absolute velocity of the grease (as indicated by the arrow) when the buckets are stationary due to overrunning operation. The inclination begins at the entrance to the passage 47. The outer end of the bucket thus overhangs somewhat the entrance of passage. The inclination of the bucket is about ten degrees and is such as to cause grease to flow radially inward. Since the rotation is clockwise, the buckets can be described as being inclined into the direction of rotation or counterclockwise. The inclined bucket has its face machined on a radius which is about half the axial width of the flange 44. This construction provides a slightly-cupped bucket face for axial retention of grease. It is to be noted that the face of the bucket makes a relatively smooth juncture with the adjacent radially-extending side wall of the passage 47. With this arrangement and since the passage 47 is curved toward the inner races at the inner end or contoured so as to give an axial component of velocity to grease and to pass it to the radially outer surface of the inner race, it is apparent that grease will be channelled to the outer surface of the inner race. The circumferential width of the buckets 46 is relatively small so that large openings exist between the rear of one bucket and the bucket face of the next bucket.

Since the inner bearing races 35, 36 are loosely fitted on driving member 11, there are slight air gaps under the inner races which act as heat insulators. In order to improve heat transfer from the inner races, piston rings 51 are assembled in tapered grooves 52 in driving member 11. These split rings 51 are of complementing cross-section in respect to the grooves 52 and are resiliently-biased outwardly into intimate contact with the inner races. The extensive side contact of the tapered rings provides a large area for the conduction of heat to the driving member 11. Rings 51 are made of a high heat conductive material relative to the materials of the other parts, such as beryllium copper, so that the heat resident in the inner races due to outer cage rotation is transferred more easily to the driving member 11 from which it can be dissipated.

In operation, driving element 11 will be accelerated and thereby rotate driven element 16 due to the engaging direction of the overrunning clutch 15. With this condition, bearings 17, 18 do not have relative rotation of inner and outer races since the entire driving-driven structure or torque transmitting device rotates as a unit on bearings 12. When the required output speed has been reached, driving element 11 will decelerate to rest while driven element 16 will be overrunning and rotating on bearings 17, 18. In a starter which has its output member permanently connected to an engine, the above-described overrunning operation occurs when starting speed is reached and the motive force to the starter is cut off after the associated engine is started. The engine then drives the output or driven starter member 16 but does not drive the starter driving element due to sprag clutch 15 which permits torque to be transmitted in one direction only. In this overrunning condition with outer race rotation, grease in the bearing cavity is thrown outward and will be in contact with the rotating spacer sleeve 25. Since sleeve 25 is sloped toward each outer race 21 and 22, it acts as a pump to channel grease toward the bearings so that the grease can be picked up by the stationary bucket fingers 46.

Since the bucket fingers are canted in the direction of the absolute velocity of the grease flow, as above described, the dynamic pressure so produced causes the grease to flow radially inward on the stationary diverters or fingers 46 into connecting slots 47. Since slots 47 are contoured so as to give an axial component of velocity to the grease, the grease is passed to the inner races 35, 36 of the bearings where it provides lubrication and cooling of the inner races by conduction of heat. The grease so channeled to the bearings is thereafter thrown out by the centrifugal action involved and is returned to the space between the bearings by virtue of the openings between the bucket fingers of the diverter sleeves.

It is to be understood that changes can be made in the preferred embodiment of the invention herein set forth by persons skilled in the art without departing from the invention which is set forth in the appended claims.

What is claimed is:

1. In a torque transmitting device having an annular rotatable driving member, an annular output member rotatably mounted on said driving member and operatively connected by an overrunning clutch to the annular output member, the bearing improvement comprised of two spaced anti-friction, grease-packed bearings rotatably supporting said output member on said driving member, the outer races of said bearings being spaced apart by a spacer sleeve positioned against the sides of said outer races, said sleeve having an inner surface which is inclined from its center toward each outer race, the interior sides of the inner races of said bearings being axially spaced opposite the ends of said sleeve, and means extending toward the ends of said spacer sleeve and carried by said driving member, said means being constructed and arranged to divert grease from adjacent said outer races to said inner races when said driving member is stationary and said output member is rotating.

2. In a torque transmitting device having a stationary shaft, an annular driving member rotatably mounted by bearings on the shaft, an annular output member rotatably mounted on said driving member and operatively connected by an overrunning clutch to the annular output member for rotation thereof in one direction, the bearing improvement comprised of two spaced anti-friction ball-type grease-packed bearings rotatably supporting said output member on said driving member, the outer races of said bearings being spaced apart by a spacer sleeve positioned against the interior sides of said outer races, said sleeve having an inner surface which is inclined from its center toward each outer race, the inner races of said bearings being axially spaced opposite said outer races, means opposite the ends of said spacer sleeve and carried by said driving member, said means being constructed and arranged to divert grease from adjacent said outer races to said inner races when said driving member is stationary and said output member is rotating, said means including radial passages contoured to direct grease axially to the radially-outer surfaces of the inner races and buckets inclined into said direction of rotation and connected to said passages for diverting grease into said passages.

3. In a torque transmitting device having a stationary shaft, an annular driving member rotatably mounted by ball bearings on the shaft, an annular output member rotatably mounted on said driving member and operatively connected by an overrunning clutch to the annular output member for rotation thereof in one direction, the bearing improvement comprised of two spaced anti-friction ball-type bearings rotatably supporting said output member on said driving member and being grease lubricated, the inner races of said bearings being axially spaced opposite said outer races, means opposite the interior ends of said outer races and carried by said driving member, said means being constructed and arranged to divert grease from adjacent said outer races to said inner races when said driving member is stationary and said output member is rotating, said means including radial passages contoured to direct grease axially to the outer surfaces of the inner races and buckets inclined into said direction of rotation and connected to said passages for diverting grease into said passages.

4. In a torque transmitting device having a stationary shaft, an annular driving member mounted by ball bearings on the shaft, an annular output member rotatably mounted on said driving member and operatively connected by an overrunning clutch to the annular output member, the bearing improvement comprised of two spaced anti-friction ball-type bearings rotatably supporting said output member on said driving member, the outer races of said bearings being spaced apart by an outer spacer sleeve positioned against the sides of said outer races, said sleeve having an inner surface which inclined from its center toward each outer race, the inner races of said bearings being axially spaced apart by two ring-like ram diverters and a wave washer between said diverters, each of said diverters being a sleeve portion with a radially-outwardly extending flange adjacent said bearings, said flange having slots facing said bearings, said flange having a plurality of outwardly extending equi-spaced fingers, said fingers having axial faces which are slightly cupped and arranged to direct grease into said slots when said output member is rotating and said driving member is stationary, and said slots terminating at the radially outer surface of said inner race and being constructed to move grease axially to said inner races.

5. In a torque transmitting device having a stationary shaft, an annular driving member mounted by ball bearings on the shaft, an annular output member rotatably mounted on said driving member and operatively connected by an overrunning clutch to the annular output member, the bearing improvement comprised of two spaced anti-friction ball-type bearings rotatably supporting said output member on said driving member, the outer races of said bearings being pressed fitted on said output member and being spaced apart by an outer spacer sleeve positioned against the sides of said outer races, said ring having an inner surface which inclined from its center toward each outer race, the inner races of said bearings being loosely fitted on said driving member and being axially spaced apart by two ring-like ram diverters and a wave washer between said diverters, each of said diverters being constructed to channel grease from adjacent each outer race onto the outer surface of said inner races when the device is overrunning, said driving member having tapered grooves at the location of said inner races, and a heat conductive ring in each of said grooves in contact with the sides thereof and in contact with the inner races whereby heat is transferred more readily to said driving member.

6. A high-speed overrunning device comprised of a driving member connected by an overrunning clutch to a driven member, said driven member being mounted on the driving member by means of two grease-packed bearing means having rolling elements, said bearing means being comprised of two inner and outer annular races spaced from each other and confining said rolling elements, a sleeve extending along the interior surface of said driven member and between said outer races, said sleeve having a radially-inner surface which is inclined from its axial center radially-outwardly, ram-diverter means adjacent each of the bearing means at the interior side thereof and having a sleeve part and a flange, said sleeve part abutting each interior side of said inner races and terminating axially-inwardly in transverse annular edge, a wavy washer biasing said ram diverters toward said inner races, said flanges having a plurality of equi-spaced fingers projecting radially-outwardly to adjacent the interior sides of said outer races, said fingers having axially-slightly-curved and radially-extending surfaces arranged to move grease radially inward when said device is overrunning, slots in said flanges beginning at the bottom of the curved surfaces of said fingers and opening towards said bearing means and being axially-curved at the inner ends for receiving grease from said surfaces whereby, when said driving member and the inner race are stationary, the fingers will ram-divert grease to and through said slots to the radially-outer surface of said inner race for cooling and lubricating, said inner races being loosely mounted on said driving member, compressed rings of high heat conductive material and having inclined sides mounted in tapered grooves in said driving member at the location of said inner races, and grease confining means radially-extending from said driven member along the axially-outer sides of each of said bearing means to the location of said inner races.

References Cited in the file of this patent
UNITED STATES PATENTS

| | | |
|---|---|---|
| 2,000,581 | Coffin et al. | May 7, 1935 |
| 2,193,267 | Burtnett | Mar. 12, 1940 |
| 2,264,635 | Graham | Dec. 2, 1941 |